United States Patent
Weber et al.

[11] 3,910,895
[45] Oct. 7, 1975

[54] TRIAZOLE COMPOUNDS

[75] Inventors: Kurt Weber; Christian Lüthi, both of Basel, Switzerland

[73] Assignee: Ciba-Geigy AG, Basel, Switzerland

[22] Filed: Dec. 12, 1972

[21] Appl. No.: 314,488

[30] Foreign Application Priority Data
Dec. 30, 1971   Switzerland..................... 19174/71

[52] U.S. Cl. ...... 260/240 D; 260/240.1; 260/37 EP; 260/37 N; 260/37 NP; 260/42; 260/21; 260/308 A; 260/566 A; 260/599; 260/961; 260/963; 260/964; 260/965; 252/301.2 W; 8/54; 8/54.2
[51] Int. Cl. ................. C07d 249/04; C07d 249/06
[58] Field of Search ........ 260/240 R, 240 C, 240 D, 260/240.1

[56] References Cited
UNITED STATES PATENTS
3,627,758   12/1971   Weber et al. ...................... 260/240
3,666,758   5/1972    Dorlars et al. ..................... 260/240

OTHER PUBLICATIONS
Wadsworth et al., J. Am. Chem. Soc., 83:1733–1788- (4–61).

*Primary Examiner*—Henry R. Jiles
*Assistant Examiner*—C. M. S. Jaisle
*Attorney, Agent, or Firm*—Joseph G. Kolodny; Prabodh I. Almaula; Michael W. Glynn

[57] ABSTRACT
New triazole compounds of the formula

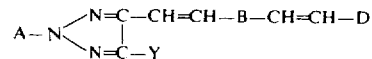

wherein
- A represents a phenyl, naphthyl or diphenylyl radical which may be substituted by non-chromophoric groups,
- B represents a 9,10-dihydrophenanthrene radical which is bonded in 2,7- positions to the —CH—CH— groups and which may be substituted by alkyl, alkoxy, halogen or sulphonic acid groups,
- D represents a phenyl, naphthyl, pyridyl or diphenylyl radical which may be substituted by non-chromophoric groups or represents a radical

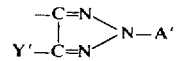

wherein
- A' represents a phenyl, naphthyl or diphenylyl radical which may be substituted by non-chromophoric groups and
- Y and Y' are identical or different and represent hydrogen, chlorine, bromine alkyl or a phenyl, naphthyl or diphenylyl radical which may be substituted by nonchromophoric groups; such compounds being particularly useful as optical brighteners.

6 Claims, No Drawings

TRIAZOLE COMPOUNDS

The present invention relates to new triazole derivatives of 9,10-dihydrophenanthrene, processes for their manufacture and their use as optical brighteners for organic substances.

It has been found that a certain class of 1,2,3-triazol-(4)-yl derivatives of 9,10-dihydrophenanthrene comprises valuable optical brighteners.

The new triazole derivatives according to the invention correspond to the general formula

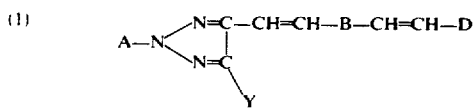

wherein A denotes a phenyl, naphthyl or diphenylyl radical optionally substituted by non-chromophoric substituents, B denotes a 9,10-dihydrophenanthrene radical which is bonded in the 2,7-position to the —CH=CH— groups and which can itself additionally contain lower alkyl or alkoxy groups, halogen or sulpho groups as substituents, and D represents a phenyl, naphthyl, pyridyl or diphenylyl radical which is optionally substituted by non-chromophoric substituents or represents a radical

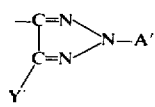

wherein A' represents a phenyl, naphthyl or diphenylyl radical which is optionally substituted by non-chromophoric substituents, and Y and Y' are identical or different and denote hydrogen, chlorine, bromine, alkyl or phenyl, naphthyl or diphenylyl which optionally possess non-chromophoric substituents.

Within the compass of the above formula, importance attaches above all to asymmetrical and symmetrical triazole derivatives which correspond to the formula

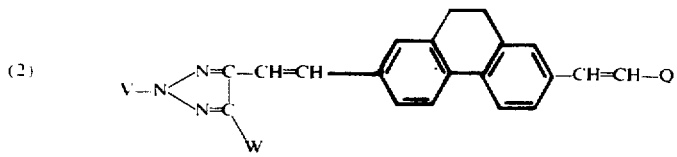

wherein V represents a radical

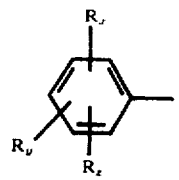

and $R_r$, $R_u$ and $R_z$ are identical to, or different from, one another and denote hydrogen or a non-chromophoric substituent, W represents hydrogen, halogen, alkyl or a radical V and Q represents naphthyl-(1), naphthyl-(2), diphenylyl-(4) or the radical

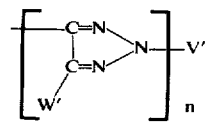

wherein W' and V' have the same meaning as W and V respectively and can, within these meanings, be identical to, or different from, W and V, and n represents the number 0 or 1.

Compounds of particular practical interest with regard to the substitution by non-chromophoric substituents are those which correspond to the formula

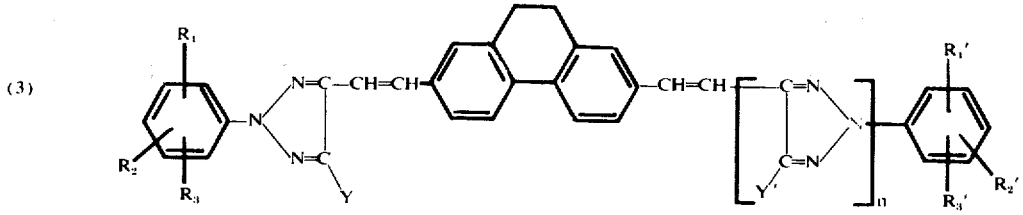

wherein $R_1$, $R_1'$, $R_2$, $R_2'$, $R_3$ and $R_3'$ are identical or different and denote hydrogen, alkyl with 1–12 C atoms, alkenyl with 3–4 C atoms, cyclohexyl, aralkyl with 1–4 C atoms in the alkyl part, alkoxy with 1-8 C atoms, phenyl-(1–4 C)-alkoxy, alkenyloxy with 3–4 C atoms, halogen, trifluoromethyl, the sulpho group, including its salts and functional derivatives, the carboxyalkoxy or carboxyl group including its salts and functional derivatives, nitrile or a sulphone group and two adjacent radicals R can form a methylenedioxy group or a fused, five-membered or six-membered, non-aromatic carbocyclic structure and Y and Y' are identical or different and represent hydrogen, alkyl, halogen or a radical

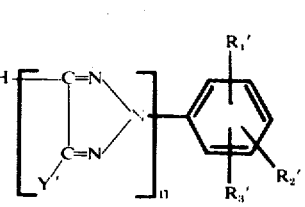

and n represents the number 0 or 1.

In the above context, chlorine is preferred as halogen. By sulpho groups and carboxyl groups there are to be understood both the free acids and their salts, the water-soluble salts, such as alkaline metal salts, ammonium salts and amine salts, being of particular interest. As functional derivatives there should in both cases above all be mentioned the esters with 1–18 C atoms (alkyl esters, alkenyl esters, aralkyl esters and phenyl esters) as well as the amides, that is to say both the unsubstituted and the monosubstituted or disubstituted amides, such as, for example, the alkylamides, hydroxyalkylamides, cycloalkylamides, aralkylamides, phenylamides and morpholides, all normally with not more than 18 C atoms. Carboxyalkoxy radicals and their functional derivatives can have the carboxyl grouping modified analogously; the alkoxy bridge member can contain up to 5 C atoms. Possible sulphone groups are arylsulphonyl, such as phenylsulphonyl, or, preferably, alkyl (1–18 C)-sulphonyl.

Compounds of preferred interest are characterised by the formulae given below:

a. Compounds of the formula

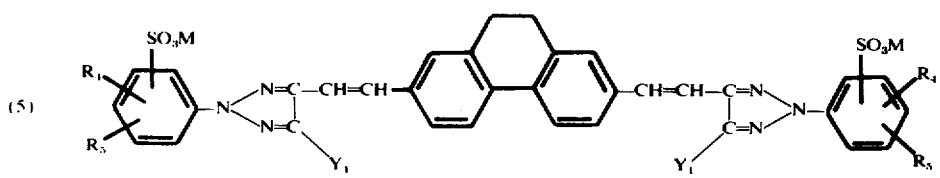

wherein the radicals $R_2$, $R_3$, $R_1'$, $R_2'$ and $R_3'$ are identical or different and denote hydrogen, alkyl with 1–12 C atoms, alkenyl with 3–4 C atoms, cyclohexyl, aralkyl with 1–4 C atoms in the alkyl part, alkoxy with 1–8 C atoms, phenyl-(1–4 C)-alkoxy, alkenyloxy with 3–4 C atoms, halogen, trifluoromethyl, the sulpho group including its salts and functional derivatives, the carboxyalkoxy or carboxyl group including their salts and functional derivatives, nitrile or a sulphone group and

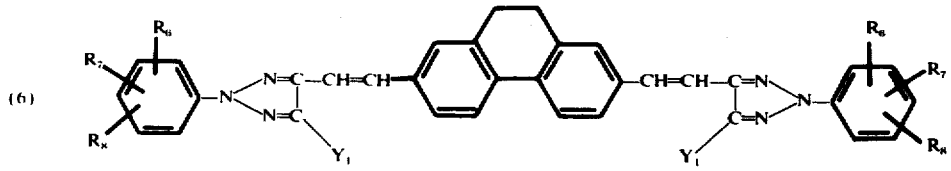

two adjacent radicals R can form a methylenedioxy group or a fused, five-membered or six-membered, non-aromatic carbocyclic structure, and Y and Y' are identical or different and represent hydrogen, alkyl, halogen or a radical

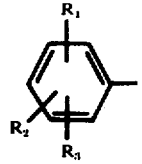

or

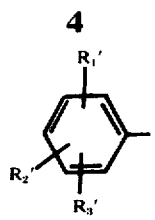

wherein $R_1$ has the same meaning as $R_2$, but these can, within a specific compound, be different from one another and M denotes a hydrogen ion or a cation which forms water-soluble salts and n represents the number 0 or 1.

b. Compounds of the formula

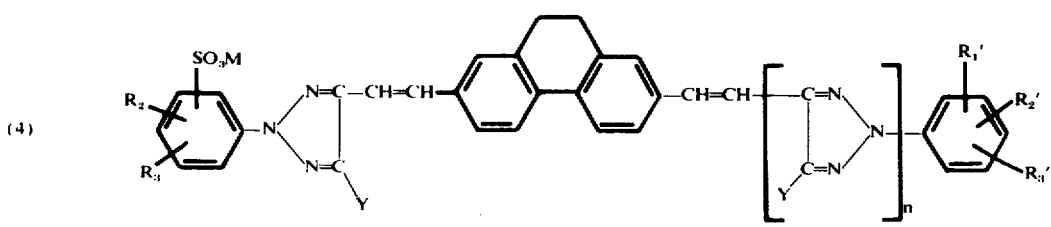

wherein $R_4$ denotes hydrogen, an alkyl group with 1–4 C atoms, an alkoxy group with 1–4 C atoms or chlorine, $R_5$ denotes hydrogen, an alkyl group with 1–4 C atoms, an alkoxy group with 1–4 C atoms or chlorine, M represents a hydrogen ion or a salt-forming cation and $Y_1$ represents hydrogen, chlorine or methyl.

c. Compounds of the formula

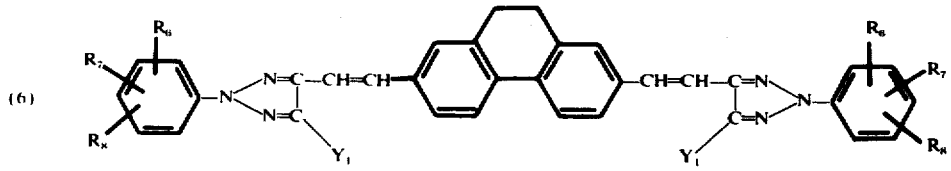

wherein $R_6$ denotes hydrogen, alkyl with 1–4 C atoms, chlorine, alkoxy with 1–4 C atoms, a carboxylic acid ester or amide group with 1–12 C atoms, a sulphonic acid ester or amide group with 1–12 C atoms, a sulphone group, nitrile or an alkenyloxy group with 3–4 C atoms, $R_7$ represents hydrogen, alkoxy with 1–4 C atoms, alkyl with 1–4 C atoms or chlorine, $R_8$ represents hydrogen, alkyl with 1–4 C atoms or chlorine and $Y_1$ denotes hydrogen, chlorine or methyl.

d. Compounds of the formula

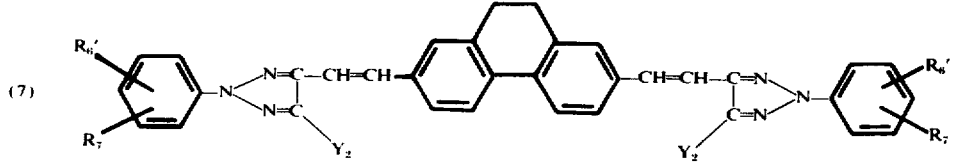

wherein $R_6'$ denotes hydrogen or the sulpho group or its Na or K salt, $R_7$ denotes hydrogen, alkoxy with 1 to 4 C atoms, alkyl with 1–4 C atoms or chlorine and $Y_2$ denotes hydrogen or methyl.

e. Compounds of the formula

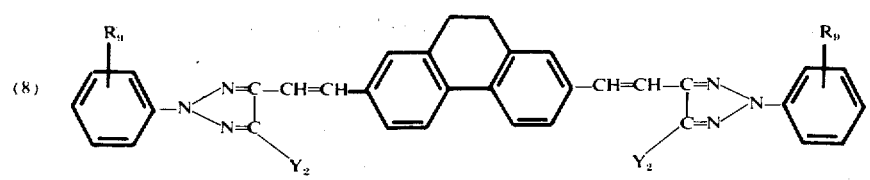

wherein $R_9$ represents hydrogen or the -$SO_3M$ group and M denotes a hydrogen ion or an alkali metal, alkaline earth metal or ammonium cation, and $Y_2$ represents hydrogen or methyl.

f. Compounds of the formula

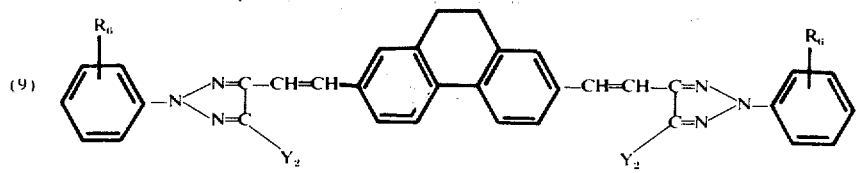

wherein $R_6$ denotes hydrogen, alkyl with 1–4 C atoms, chlorine, alkoxy with 1–4 C atoms, a carboxylic acid ester or amide group with 1–12 C atoms, a sulphonic acid ester or amide group with 1–12 C atoms, a sulphone group, or nitrile or an alkenyloxy group with 3–4 C atoms and $Y_2$ represents hydrogen or methyl.

The compounds of the formula (1) and of the subordinate formulae can be manufactured analogously to methods which are in themselves known. In general, the procedure followed is to react about 1 mol equivalent of a compound of the formula $$Z_1—B—Z_1 \quad (10)$$

with about 1 mol equivalent of a compound of the formula

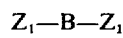

(11) 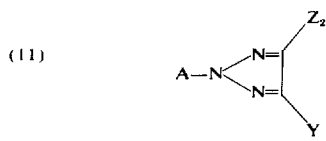

and about 1 mol equivalent of a compound of the formula $$Z_2—D \quad (12)$$

with one of the symbols $Z_1$ and $Z_2$ denoting a O=CH- group and the other denoting one of the groupings of the formulae (13a) 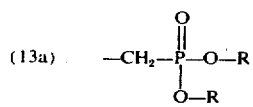   (13b) 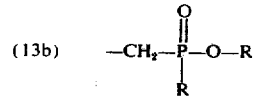

(13c) 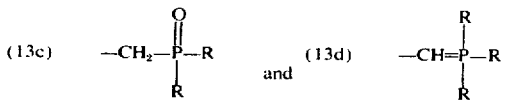

(13c) —CH$_2$—P(=O)(R)—R  and  (13d) —CH=P(R)—R wherein R represents an alkyl radical, preferably with up to 6 carbon atoms, which is optionally substituted further, an aryl radical, preferably a phenyl radical, a cycloalkyl radical, preferably a cyclohexyl radical, or an aralkyl radical, preferably a benzyl radical.

Entirely analogously, a. compounds of the formula (2) are obtained by reaction of 1 mol equivalent of the compound of the formula

(14) 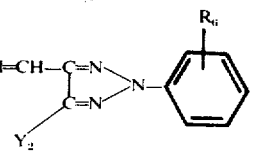

with about 1 mol equivalent of a compound of the formula

(15) 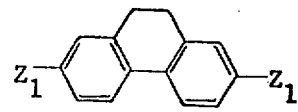

and about 1 mol equivalent of a compound of the formula $$Z_2—Q \quad (16)$$

(Meaning of the symbols as indicated above).

b. Compounds of the formula (3) are obtained by reaction of about 1 mol equivalent of a compound of the formula

(14) 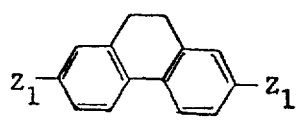

with about 1 mol equivalent of a compound of the formula (17)

$$\begin{bmatrix} R_2 & & & N=C-Z_2 \\ & & N & \\ & & N=C \\ R_3 & & & Y \end{bmatrix}_n$$
(with $R_1$ on top of ring)

and about 1 mol equivalent of a compound of the formula (18)

$$\begin{bmatrix} Z_2-C=N & & R_2' \\ & N- & \\ Y-C=N & & R_3' \end{bmatrix}_n$$
(with $R_1'$ on top of ring)

c. Compounds of the formula (4) are obtained by reaction of about 1 mol equivalent of a compound of the formula

(14) $Z_1$—[phenanthrene]—$Z_1$ with about 1 mol equivalent of a compound of the formula (19)

$$\begin{array}{c} SO_3M \\ R_2 \\ \\ R_3 \end{array} \!\!\!\! \begin{array}{c} N=C---Z_2 \\ -N \\ N=C \\ Y \end{array}$$

and about 1 mol equivalent of a compound of the formula

(18) or $$\begin{bmatrix} Z_2-C=N & & R_2' \\ & N- & \\ Y-C=N & & R_3' \end{bmatrix}_n$$
(with $R_1'$ on top of ring)

d. Compounds of the formula (5) are obtained by reaction of about 1 mol equivalent of a compound of the formula

(14) $Z_1$—[phenanthrene]—$Z_1$ with about 2 mol equivalents of a compound of the formula (20)

$$\begin{array}{c} SO_3M \\ R_1 \\ \\ R_5 \end{array} \!\!\!\! \begin{array}{c} N=C-Z_2 \\ -N \\ N=C \\ Y_1 \end{array}$$

Thus, for example, dialdehydes of the formula

(21)  O=CH—[phenanthrene]—CH=O can be reacted with monofunctional compounds of the formula (22)

$$A-N \!\!\! \begin{array}{c} N=C-Z_1 \\ N=C \\ Y \end{array}$$

or $$Z_1-D \qquad (23)$$

or monoaldehydes of the formula (24)

$$A-N \!\!\! \begin{array}{c} N=C-CHO \\ N=C \\ Y \end{array}$$

or $$OHC-D \qquad (25)$$

with bifunctional compounds of the formula

(14) $Z_1$—[phenanthrene]—$Z_1$ wherein A, D and Y have the indicated meaning and $Z_1$ denotes one of the phosphorus-containing substituents of the formulae (13a to 13d).

The phosphorus-compounds of the formulae (22), (23) and (14) herein required as starting substances are obtained in a manner which is in itself known by reacting halogenomethyl compounds, preferably chloromethyl or bromomethyl compounds, of the formula (26)

$$A-N \!\!\! \begin{array}{c} N=C-CH_2-Halogen \\ N=C \\ Y \end{array}$$

D-CH$_2$-Halogen    (27)

Halogen-CH$_2$—[phenanthrene]—CH$_2$-Halogen    (28)

with phosphorus-compounds of the formulae (29a)  $R-O-\underset{\underset{O-R}{|}}{\overset{\overset{O}{\|}}{P}}-O-R$     (29b)  $R-O-\underset{\underset{R}{|}}{P}-O-R$ -Continued (29c) 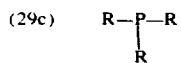  or  (29d) 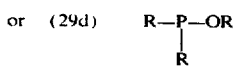

In these formulae R has the indicated meaning, with radicals R bonded to oxygen preferably being lower alkyl groups whilst radicals R bonded directly to phosphorus are preferably aryl radicals such as benzene radicals.

For the manufacture of compounds according to the formula (2), those of the abovementioned process variants are in particular considered according to which about 1 mol equivalent of a compound of the formula

(30) 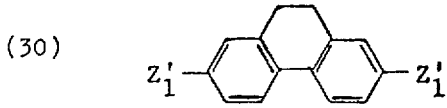

is reacted with 1 mol equivalent each of a compound of the formula

(31) 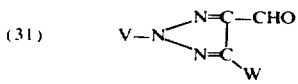

and

Q—CHO (32)

wherein V, M and Q have the abovementioned meanings and $Z_1'$ denotes a grouping of the formulae (13a) 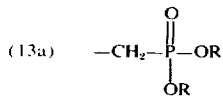   (13b) 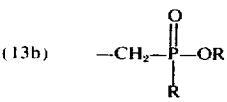

(13c) 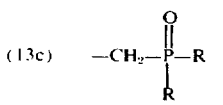   (13d) and 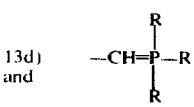

wherein R represents an optionally substituted alkyl, cycloalkyl, aryl or aralkyl radical.

A variant of particular practical importance consists of using, as dihydrophenanthrene components according to the formula (14), those which correspond to the formula

(33) 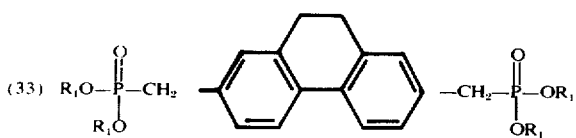

wherein $R_1$ denotes an alkyl group with 1 to 6 carbon atoms.

The manufacturing process is advantageously carried out in inert solvents. As examples thereof there may be mentioned hydrocarbons such as toluene and xylene or alcohols such as methanol, ethanol, isopropanol, butanol, glycols, glycol-ethers such as 2-methoxyethanol, hexanols, cyclohexanol andd cyclooctanol, and also ethers such as diisopropyl ether, tetrahydrofurane and dioxane, as well as dimethylsulphoxide, formamide and N-methylpyrrolidone. Polar organic solvents such as dimethylformamide and dimethylsulphoxide are particularly suitable. Some of the reactions can also be carried out in aqueous solution.

The temperature at which the reaction is carried out can vary within wide limits. It is determined α) by the stability of the solvents used towards the reactants, especially towards the strongly basic alkali metal compounds, β) by the reactivity of the condensation partners and γ) by the activity of the combination of solvent-base as the condensation agent.

Accordingly, in practice temperatures between about 10° and 100°C are in general used, especially if dimethylformamide or dimethylsulphoxide are used as solvents. The preferred temperature range is about 20° to 60°C. However, under certain circumstances higher temperatures can also be used if this is desired for reasons of saving time or a less active but cheaper condensation agent is to be employed. Fundamentally, reaction temperatures in the range of 10° to 180°C are thus also possible.

As strongly basic alkali metal compounds, the hydroxides, amides and alcoholates (preferably those of primary alcohols containing 1 to 4 carbon atoms) of the alkali metals are above all used, and for economic reasons those of lithium, sodium and potassium are of predominant interest. However, in principle, and in special cases, it is also possible successfully to use alkali metal sulphides and alkali metal carbonates, aryl-alkali metal compounds such as, for example, phenyllithium, or strongly basic amines (including ammonium bases, for example trialkylammonium hydroxides).

Using the process described above mixtures of asymmetrically substituted compounds according to the formula (1) and the two corresponding symmetrically substituted compounds are in most cases obtained in the first instance, as a result of competing reaction of the three reactants. These components can be separated on the basis of their different solubility behaviour in water by removing the water-insoluble compound by filtration. The water-soluble compounds remaining in the filtrate can then be separated on the basis of their different solubility in water.

A further process for the manufacture of compounds according to the formula (1) consists of starting from dihydrophenanthrene derivatives of the formula

(34) 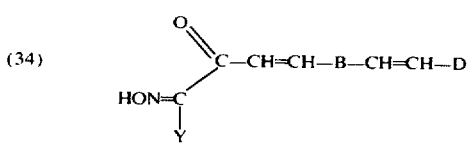

manufacturing the corresponding oxime-hydrazine with a hydrazine of the formula $H_2N$—NH—A and then synthesising the triazole ring by cyclisation.

The starting substances of the formula (34) are obtained analogously to processes which are in themselves known.

In the case of the manufacture of compounds according to the formula (3) the process consists, for example, of reacting a compound of the formula

(35) 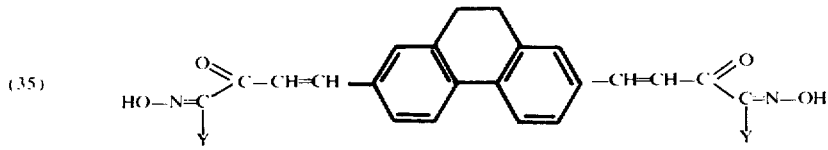

with a hydrazine of the formula (36a) 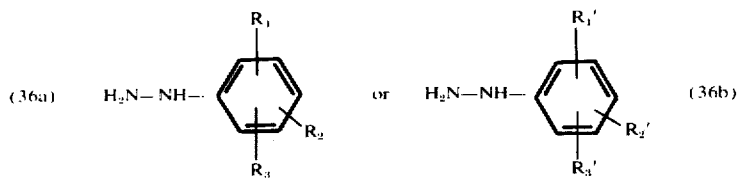 (36b)

and cyclising the resulting oxime-hydrazone of the formula

(37) 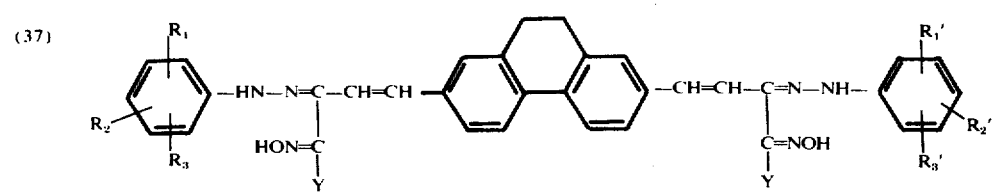

to give the compound of the formula (3).

Symmetrical compounds are obtained analogously by reaction of 1 mol of a compound of the formula

(35) 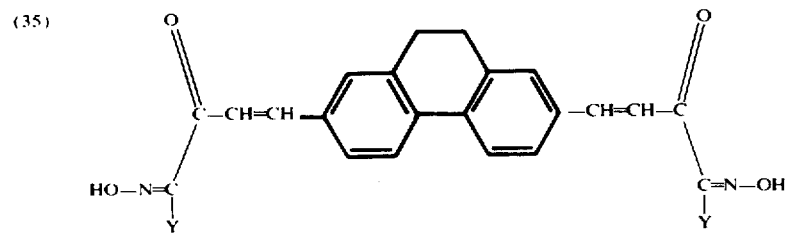

with 2 mols of a hydrazine of the formula (36a) and cyclisation of the oxime-hydrazone thereby obtained, of the formula

(38) 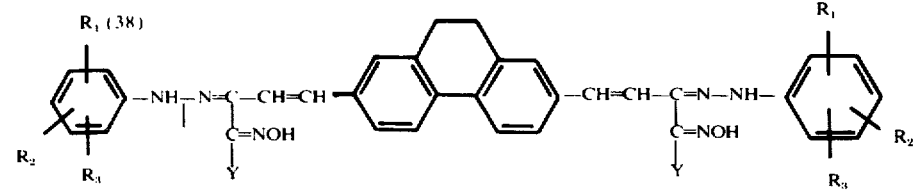

The reaction of a compound of the formula (35) with a compound of the formula (36a) or (36b) is in general carried out in an organic solvent which is inert towards the reactants, for example optionally halogenated aliphatic or aromatic hydrocarbons, alcohols, ethers, glycols, formamide, dimethylformamide, acetonitrile and the like, or in a low molecular alkanecarboxylic acid, such as acetic acid or propionic acid, at a temperature of 10° to 100°C, preferably 30° to 70°C. The cyclisation of the isolated oxime-hydrazone of the formula (37) or (38) to give the compound of the formula (3) is appropriately effected by means of agents which split off water, for example anhydrides or halides, of alkanecarboxylic acids, such as, say, acetic anhydride or propionic acid chloride, or of phosphorus halides, such as phosphorus trichloride or phosphorus pentachloride.

These reactions are in general carried out within a temperature range of 10° to 160°C, preferably of 30° to 120°C. When using acid halides the reaction can be carried out in an organic solvent which is inert towards the oxime-hydrazone and the acid halide, such as optionally halogenated hydrocarbons, ethers, dimethylformamide and the like. If an anhydride is employed as the agent which splits off acid, the reaction can be allowed to take place in an excess of the agent, optionally in the presence of a further solvent. The cyclisation to give the triazole of the formula (1) can also be effected by heating with urea to temperatures of 100° to 210°C, preferably 120° to 180°C, in which case a 2-fold to 20-fold amount of urea, relative to the dry weight of the oxime-hydrazone, is in general employed.

The new compounds defined above possess a more or less pronounced fluoresence in the dissolved or finely divided state. They can be employed for the optical brightening of the most diverse synthetic, semi-synthetic or natural organic materials or substances which contain such organic materials.

As such there may for example be mentioned the following groups of organic materials, where an optical brightening thereof is relevant, without the survey which follows being intended to express any restriction thereto:

I. Synthetic organic high molecular materials
   a. Polymerisation products based on organic compounds containing at least one polymerisable carbon-carbon double bond, that is to say their homopolymers or copolymers as well as their after-treatment products such as, for example, crosslinking, grafting or degradation products, polymer blends, products obtained by modification of reactive groups, and the like, for example polymers based on $\alpha,\beta$-unsaturated carboxylic acids or derivatives of such carboxylic acids, especially on arcrylic compounds (such as, for example, acrylic esters, acrylic acid, acrylonitrile, acrylamides and their derivatives or their methacryl analogues) and polymers based on vinyl and vinylidene compounds (such as, for example, vinyl alcohol),
   b. Polymerisation products such as are, for example, obtainable by ring opening, for example, polyamides of the polycaprolactam type, and also polymers which are obtainable both via polyaddition and via polycondensation, such as polyethers or polyacetals,
   c. Polycondensation products or precondensates based on bifunctional or polyfunctional compounds possessing condensable groups, their homocondensation and co-condensation products, and after-treatment products, such as, for example, polyamides (for example hexamethylenediamine adipate), maleate resins, melamine resins, their precondensates and analogues, polycarbonates and silicones,
   d. Polyaddition products such as polyurethanes (crosslinked and non-crosslinked) and epoxide resins.

II. Semi-synthetic organic materials such as, for example, cellulose esters of varying degrees of esterification (acetate or triacetate) or cellulose ethers, regenerated cellulose (viscose or cuprammonium cellulose), or their after-treatment products, and casein plastics.

III. Natural organic materials of animal or vegetable origin, for example based on cellulose or proteins, such as cotton, wool, linen, silk, natural lacquer resins, starch and casein.

The organic materials to be optically brightened can be in the most diverse states of processing (raw materials, semi-finished goods or finished goods). On the other hand, they can be in the form of structures of the most diverse shapes, say for example predominantly three-dimensional bodies such as sheets, profiles, injection mouldings, various machined articles, chips, granules or foams, and also as predominantly two-dimensional bodies such as films, foils, lacquers, coverings, impregnations and coatings, or as predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes and the like.

Fibre materials can, for example, be in the form of endless filaments (stretched or unstretched), staple fibres, flocks, hanks, textile filaments, yarns, threads, fibre fleeces, felts, waddings, flock structures or woven textile fabrics, textile laminates, knitted fabrics and papers, cardboards or paper compositions, and the like.

The compounds to be used according to the invention are of importance, inter alia, for the treatment of organic textile materials, especially woven textile fabrics. Where fibres, which can be in the form of staple fibres or endless filaments or in the form of hanks, woven fabrics, knitted fabrics, fleeces, flock substrates or laminates, are to be optically brightened according to the invention, this is advantageously effected in an aqueous medium, wherein the compounds in question are present in a finely divided form, (suspensions or possibly solutions). If desired, dispersing agents, stabilisers, wetting agents and further auxiliaries can be added during the treatment. Depending on the type of brightener compound used, it may prove advantageous preferably to carry out the treatment in a neutral or alkaline or acid bath. The treatment is usually carried out at temperatures of about 20° to 140°C, for example at the boiling point of the bath or near it (about 90°C). Solutions or emulsions in organic solvents can also be used for the finishing, according to the invention, of textile substrates, as is practised in the dyeing trade in so-called solvent dyeing (padthermofix application, or exhaustion dyeing processes in dyeing machines).

The new optical brighteners according to the present invention can further be added to, or incorporated in, the materials before or during their shaping. Thus they can for example be added to the compression moulding composition or injection moulding composition during the manufacture of films, foils or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or prepolymers), that is to say before or during the polymerisation polycondensation or polyaddition, Powdering onto polymer chips or granules for spinning compositions, Bath dyeing of polymer chips or granules for spinning compositions, Metered addition to spinning melts or spinning solutions, and Application to the tow before stretching.

The new optical brighteners according to the present invention can, for example, also be employed in the following use forms:
   a. Mixed with dyestuffs (shading) or pigments (for example white pigments), or as an additive to dye baths, printing pastes, discharge pastes or reserve pastes, or for the after-treatment of dyeings, prints or discharge prints.
   b. Mixed with so-called "carriers", wetting agents, plasticisers, swelling agents, anti-oxidants, light protection agents, heat stabilisers and chemical bleaching agents (bleaching bath additives).
   c. Mixed with crosslinking agents or finishes (for example starch or synthetic finishes), and in combination with the most diverse textile finishing processes, especially synthetic resin finishes (for example creaseproof finishes such as "wash-and wear", "permanent-press" or "no-iron"), as well as flameproof finishes, soft handle finishes or antistatic finishes, or antimicrobial finishes.

d. Incorporation of the optical brighteners into polymeric carriers (polymerisation, polycondensation or poly-addition products), in a dissolved or dispersed form, for use, for example, in coating compositions, impregnated compositions or binders (solutions, dispersions and emulsions) for textiles, fleeces, paper and leather.

e. As additives to so-called "master batches".

f. As additives to the most diverse industrial products in order to render these more marketable (for example improving the appearance of soaps, detergents, pigments and the like).

g. In combination with other optically brightening substances.

h. In spinning bath preparations, that is to say as additives to spinning baths such as are used for improving the slip for the further processing of synthetic fibres, or from a special bath before the esterification of the fibre.

i. As scintillators for various purposes of a photographic nature, such as, for example, for electrophotographic reproduction or supersensitisation.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or a combined chemical/thermal treatment. Thus, for example, the appropriate procedure to follow in optically brightening a series of fibre substrates with the brighteners according to the invention is to impregnate these fibres with the aqueous dispersions or solutions of the brighteners at temperatures below 75°C, for example at room temperature, and to subject them to a dry heat treatment at temperatures above 100°C, it being generally advisable additionally to dry the fibre material beforehand at a moderately elevated temperature, for example at not less than 60°C and up to about 130°C. The heat treatment in the dry state is then advantageously carried out at temperatures between 120° and 200°C, for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amounts of 0.0001 per cent by weight. However, amounts of up to about 1 percent by weight can also be employed. For most practical purposes, amounts between 0.0005 and 0.5 per cent by weight are of preferred interest.

The new optical brighteners are also particularly suitable for use as additives for wash liquors or industrial and domestic washing agents, to which they can be added in various ways. They are appropriately added to washing liquors in the form of their solutions in water or organic solvents or in a finely divided form, as aqueous dispersions. They are advantageously added to domestic or industrial washing agents in any stage of the manufacturing process of the washing agent, for example to the so-called "slurry" before spray-drying the washing powder, or during the preparation of liquid washing agent combinations. They can be added either in the form of a solution or dispersion in water or other solvents or, without auxiliaries, as a dry brightening powder. For example, the brightening agents can be mixed, kneaded or ground with the detergent substances and mixed, in this form, into the finished washing powder. However, they can also be sprayed in a dissolved or pre-dispersed form onto the finished washing agent.

Possible washing agents are the known mixtures of detergent substances such as, for example, soap in the form of chips and powders, Syndet (soluble salts of sulphonates of higher fatty alcohols), arylsulphonic acids with higher and/or multiple alkyl substituents, sulphocarboxylic acid esters of medium to higher alcohols, fatty acid acylaminoalkyl or acylaminoaryl-glycerinesulphonates, phosphoric acid esters of fatty alcohols and the like. So-called "builders" which can be used are, for example, alkali metal polyphosphates and polymetaphosphates, alkali metal pyrophosphates, alkali metal salts of carboxymethylcellulose and other soil redeposition inhibitors and also alkali metal silicates, alkali metal carbonates, alkali metal borates, alkali metal perborates, nitrilotriacetic acids, ethylenediaminotetraacetic acids, and foam stabilisers such as alkanolamides of higher fatty acids. They can further contain: antistatic agents, skin protection agents which restore fat, such as lanolin, and also enzymes, anti-microbial agents, perfumes and dyestuffs.

The new optical brighteners have the particular advantage that they are also active in the presence of active chlorine donors such as, for example, hypochlorite, and can be used without significant loss of the effects in wash liquors containing non-ionic washing agents, for example alkylphenol polyglycol ethers.

The compounds according to the invention are added in amounts of 0.005 - 1 percent or more, relative ot the weight of the liquid or pulverulent finished washing agent. Washing liquors which contain the indicated amounts of the optical brighteners claimed impart a brilliant appearance in daylight when used to wash textiles of cellulose fibres, polyamide fibres, cellulose fibres with a high quality finish and the like.

The washing treatment is carried out as follows, for example: the textiles indicated are treated for 1 to 30 minutes at 20° to 100°C in a washing liquor which contains 1 to 10 g/kg of a built-up composite washing agent and 0.05 to 1 percent, relative to the weight of the washing agent, of the claimed brighteners. The liquor ratio can be 1:3 to 1:50. After washing, the textiles are rinsed and dried in the usual manner. The washing liquor can contain 0.2 g/l of active chlorine (for example as hypochlorite) or 0.1 to 2 g/l of sodium perborate as a bleaching additive.

In the examples parts are always parts by weight, unless otherwise indicated, and percentages are always percentages by weight. Unless otherwise noted, melting points and boiling points are uncorrected.

Within the framework of the present invention it is also possible without difficulty — depending on the special applicational requirements — to employ the new asymmetrical compounds which have been described mixed with the corresponding compounds of symmetrical structure, obtainable from the competing reaction of the manufacturing process, for the purpose of optical brightening. This means that in the practice of applying the compounds it is also possible — depending on the end use — to dispense with separation of the competing reaction products. If appropriate, a symmetrical water-insoluble compound can be separated off, whilst a mixture of the water-soluble compounds is employed for the purpose of optical brightening.

If appropriate it is possible, in order to reduce the proportion of a symmetrical water-insoluble compound in the reaction mixture, to carry out a reaction by employing, per mol equivalent of the bifunctional reactant used, a total of about 2 mol equivalents of monofunctional reactants, in which the ratio of component containing sulphone groups to component free of sulphone groups can lie approximately in the molar ratio of between 1 : 1 and 10 : 1.

EXAMPLE 1

7.2 g of 2,7-bis-(diethoxyphosphonomethyl)-9,10-dihydrophenanthrene of the formula

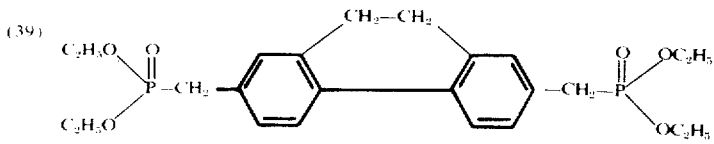

and 5.2 g of 2-phenyl-1,2,3-triazol-4-aldehyde are dissolved in 150 ml of anhydrous dimethylformamide at 40°C whilst stirring and displacing the air by nitrogen. 2.2 g of sodium methylate (content: 98.4%) are introduced over the course of about 5 minutes at 40°–45°C. The mixture is stirred for a further 2 hours at 40°–45°C, cooled to room temperature, diluted with 150 ml of desalinated water, and neutralised with a little formic acid, and the product which has crystallised out is filtered off and washed with desalinated water. After drying at 90°–100°C in vacuo, the crude product is first recrystallised from 150 ml of tetrachloroethylene using fuller's earth, and then from 50 ml of dioxane. 1.8 g of the compound of the formula are obtained as a pale yellow crystal powder of melting point: 205°–206°C.

To manufacture the compound (40) it is equally well possible to use, in place of the 2,7-bis-(diethoxyphosphonomethyl)-9,10-dihydrophenanthrene of the formula (39) employed, the equivalent amount of 2,7-bis-(dimethoxyphosphonomethyl)-9,10-dihydrophenanthrene of the formula

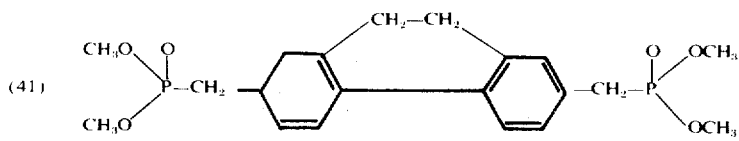

Equally, dimethylsulphoxide can be used as the solvent instead of dimethylformamide. Finally, potassium hydroxide powder or sodium hydroxide powder can be used as alkaline condensation agents instead of sodium methylate.

2,7-Bis-(diethoxyphosphonomethyl)-9,10-dihydrophenanthrene of the formula (39) can be obtained as follows:

60 g of 2,7-Bis-chloromethyl-9,10-dihydrophenanthrene are introduced in portions, over the course of 20 minutes, into 200 ml of diethyl phosphite at 120°–125°C, whilst stirring. After the introduction, the mixture is heated to 140°C and stirred for 2 hours at 140°–145°C. The excess triethyl phosphite is distilled off under normal pressure. About 95 g of the compound of the formula (39) are obtained as a viscous liquid which solidifies to crystals after about one week. If instead of triethyl phosphite, trimethyl phosphite is used and the reaction is carried out at approx. 115°C, 2,7-(dimethoxyphosphonomethyl)-9,10-dihydrophenanthrene of the formula (41) is obtained. The compound of the formula (40) can be obtained in a similar manner to that described above by reacting the dialdehyde of the formula

(42) 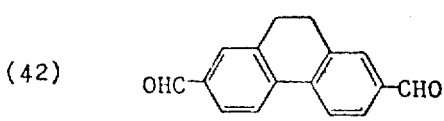

with 2 mol equivalent of the phosphonate of the formula

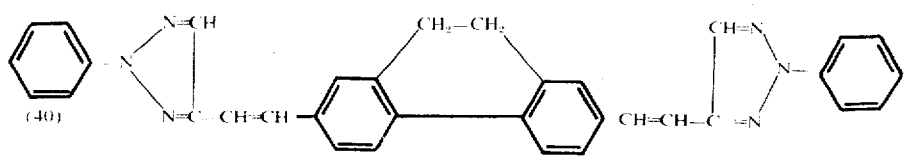

(43) 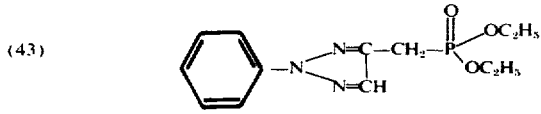

The dialdehyde of the formula (42) can be obtained as follows:

7 g of sodium metal are dissolved in 350 ml of absolute methanol whilst stirring. 32.1 g of 2-nitropropane are then added dropwise and thereafter 38.8 g of 2,7-bis-chloromethyl-9,10-dihydrophenanthrene are introduced. The reaction mixture is then heated to the boil and boiled under reflux for 4 hours. After cooling to 20°C, the product which has crystallised out is filtered off and washed firstly with alcohol, then with water and again with alcohol. After drying in vacuo at 60°–65°C, 23.0 g of the dialdehyde of the formula (42), of melting point of 160°–163°C, are obtained. After recrystallisation from 150 ml of dioxane with addition of active charcoal, 13.6 g of the dialdehyde of the formula (42) are obtained as a crystal powder of melting point of 162°–163°C.

The phosphonate of the formula (43) can be obtained by reaction of 2-phenyl-4-bromo-methyl-1,2,3-triazole with an excess of triethyl phospite at 140°–145°C.

The compounds of the formula tered off and first washed with 2 liters of a solution of 200 g of sodium chloride per liter of desalinated water and then with 1 liter of alcohol. After drying at 100°–110°C in vacuo, about 37.5 g of the compound of the formula

(53) 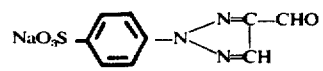

are obtained.

The sodium salt of the 5-methyl-2-(4-sulphophenyl)1,2,3-triazol-4-aldehyde used can be obtained as follows: 7.5 g of 5-methyl-2-phenyl-1,2,3-triazol-4-aldehyde are introduced over the course of 20 minutes into 40 ml of oleum containing 25 percent of SO₃, whilst stirring and ensuring, by cooling with ice water, that the temperature does not exceed 40°C. The brown solution is stirred for a further 4 hours at room temperature and is then poured out onto 300 g of ice. The whole is heated to the boil and 30 g of sodium chloride are added, whereupon the product dissipates. After cooling, the product which has crystallised out is filtered off, stirred with 300 ml of a sodium chloride solution which has been obtained by dissolving 200 g of sodium chloride in one liter of desalinatned water, neutralised with a little 30 percent strength sodium hydroxide solution, filtered off, washed with the same sodium chloride solution and dried in vacuo at 100°–110°C.

(44) 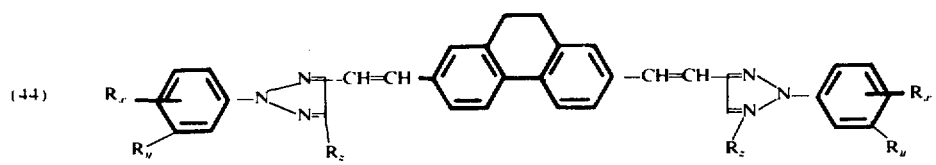

listed in the table which follows are obtained analogously.

Table

| Compound No. | $R_r$ | $R_u$ | $R_z$ |
|---|---|---|---|
| (45) | H | H | CH₃ |
| (46) | 4—SO₃Na | H | H |
| (47) | 4—SO₃K | H | CH₃ |
| (48) | 2— or 4—SO₃Na | Cl | H |
| (49) | 4— Cl | H | H |
| (50) | H | Cl | H |
| (51) | H | CH₃ | H |
| (52) | H | OCH₃ | H |

The sodium salt of the 2-(4-sulphophenyl)-1,2,3-triazol-4-aldehyde used can be obtained as follows: 34.6 g of 2-phenyl-1,2,3-triazol-4-aldehyde are introduced in portions, over the course of 25 minutes, into 160 g of oleum containing 10 percent of SO₃, at room temperature, whilst stirring. The dark brown solution is stirred for a further 23 hours at room temperature and is carefully poured out onto 1 kg of ice. A slight cloudiness in the resulting solution is removed by filtration, the clear filtrate is heated to 50°C, 200 g of sodium chloride are added, the mixture is cooled to approx. 10°C and the product which has crystallised out is fil- 12.2 g of the compound of the formula

(54) 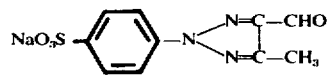

are obtained and can be freed of a little admixed sodium chloride by recrystallisation from water.

The sodium salt of the 2-(3-chloro-4-sulphophenyl)-1,2,3-trizol-4-aldehyde used can be obtained as follows: 8.3 g of 2-(3-chlorophenyl)-1,2,3-triazol-4-aldehyde are introduced over the course of 15 minutes into 40 ml of oleum of 25 percent SO₃ content, in the course of which the temperature rises to 32°C. The reaction mixture is stirred for about 22 hours at room temperature and 5 hours at 50°–55°C. After cooling to room temperature, the red-brown solution is poured out onto 250 g of ice, the resulting solution is heated to the boil, 50 g of sodium chloride are added and the mixture is allowed to crystallise. The product which has crystallised out is filtered off, stirred with 300 ml of a solution of 300 g of sodium chloride in one liter of desalinated water, neutralised with a little 30 percent strength sodium hydroxide solution, filtered off, washed with 300 ml of the same sodium chloride solution and with 100 ml of alcohol and dried in vacuo at 100°–110°C. 9.0 g of the compound of the formula

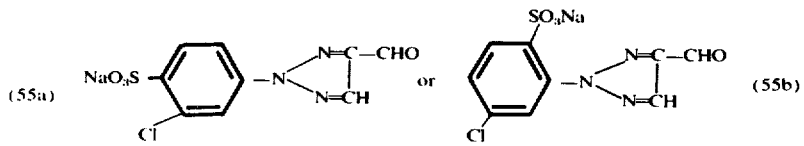

EXAMPLE 2

A polyester fabric (for example "Dacron") is padded at room temperature (about 20°C) with an aqueous dispersion which per liter contains 0.1 to 1 g of one of the compounds of the formulae (40), (45) or (49) to (52) and 1 g of an addition product of about 35 mols of ethylene oxide to 1 mol of octadecyl alcohol and is dried at about 100°C. The dry material is subsequently subjected to a heat treatment at about 220°C for 30 seconds. The polyester fabric treated in this way displays a strong optical brightening effect.

EXAMPLE 3

A polyamide fibre fabric (Perlon) is introduced, using a liquor ratio of 1:40, into a bath at 60°C which contains (relative to the weight of the fabric) 0.1 percent of one of the brighteners of the formulae (40) or (45) to (52) and, per liter, 1 g of 80 percent strength acetic acid and 0.25 g of an addition product of 30 to 35 mols of ethylene oxide to one mol of technical stearyl alcohol. The mixture is warmed to the boil over the course of 30 minutes and is kept at the boil for 30 minutes. After rinsing and drying, a good brightening effect is obtained.

If instead of the fabric of polyamide-6 a fabric of polyamide-66 (Nylon) is used, similar brightening effects are obtained.

Finally, it is also possible to work under high temperature conditions, for example for 30 minutes at 130°C. For this type of use, it is advisable to add 3 g/l of hydrosulphite to the liquor.

EXAMPLE 4

10,000 g of a polyamide in chip form, manufactured from hexamethylenediamine adipate in a known manner, are mixed for 12 hours in a tumbler vessel with 30 g of titanium dioxide (rutile modification) and 5 g of one of the compounds of the formulae (40) or (45) to (52). The chips treated in this way are fused in a kettle heated by means of oil or diphenyl vapour to 300° – 310°C, after displacing the atmospheric oxygen by steam, and are stirred for half an hour. Thereafter the melt is extruded under nitrogen pressure of 5 atmospheres gauge through a spinneret and the filament which has been spun in this way and cooled is wound up on a spinning bobbin. The resulting filaments show an excellent brightening effect of good fastness to light.

If instead of a polyamide manufactured from hexamethylenediamine adipate a polyamide manufactured from ε-caprolactam is used, similarly good results are obtained.

EXAMPLE 5

An intimate mixture of 100 parts of polyvinyl chloride, 3 parts of stabiliser (Advastat BD 100; Ba/Cd complex, 2 parts of titanium dioxide, 59 parts of dioctyl phthalate and 0.01 to 0.2 part of one of the compounds of the formulae (40), (45) or (49) to (52) is milled on a calander at 150° to 155°C to give a film. The opaque polyvinyl chloride film thus obtained has a substantially higher degree of whiteness than a film which does not contain the optical brightener.

EXAMPLE 6

100 parts of polystyrene and 0.1 part of one of the compounds of the formulae (40), (45) or (49) to (52) are fused with exclusion of air for 20 minutes at 210°C in a tube of 1 cm diameter. After cooling, an optically brightened polystyrene mass of good fastness to light is obtained.

EXAMPLE 7

100 g of "fibre grade" polypropylene are intimately mixed with 0.8 g of one of the compounds of the formulae (40), (45) or (49) to (52) and fused at 280° to 290°C whilst stirring. The melt is spun in accordance with melt spinning processes which are in themselves known through customary spinn rets and is stretched. Strongly brightened polypropylene fibres are obtained.

EXAMPLE 8

100 g of polyester granules of terephthalic acid ethylene glycol polyester are intimately mixed with 0.05 g of one of the compounds of the formulae (40), (45) or (49) to (52) and the mixture is fused at 285°C whilst stirring. After spinning through customary spinnerets, strongly brightened polyester fibres are obtained.

The compounds of the formulae (40), (45) or (49) to (52) can also be added to the starting substances before or during the polycondensation to give the polyester.

We claim:

1. A triazole derivative corresponding to the formula

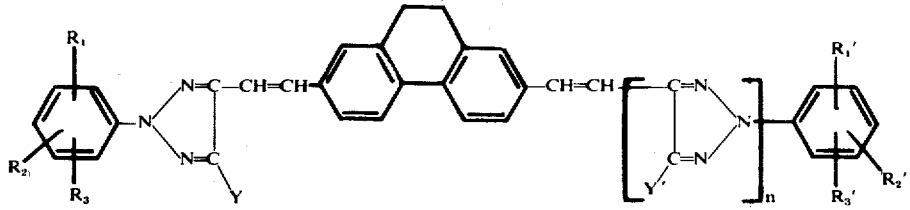

wherein $R_1$, $R'_1$, $R_2$, $R'_2$, $R_3$ and $R'_3$ are identical or different and denote hydrogen, alkyl with 1–12 C atoms, alkenyl with 3–4 C atoms, cyclohexyl, phenyl-(1–4 C)-alkyl, alkoxy with 1-8 C atoms, phenyl- (1–4 C)-alkoxy, alkenyloxy with 3–4 C atoms, halogen, trifluoromethyl, the sulpho group, including their water-soluble salts esters and amides, the carboxyalkoxy wherein the alkoxy group contains up to 5 carbon atoms or carboxyl group, including its water-soluble salts, sulpho or carboxylic acid esters and sulpho or carboxylic amides, or a nitrile group, a phenylsulphonyl group or an alkylsulphonyl group having 1–18 C atoms, and two adjacent radicals R can form a methylenedioxy group and Y and Y' are identical or different and represent hydrogen, methyl, halogen or a radical

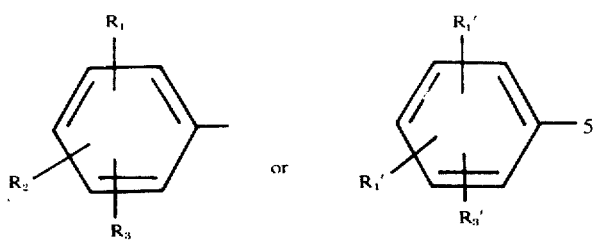

and $n$ represents the number 0 or 1, said sulpho or carboxylic acid esters being alkyl esters or alkenyl esters having up to 18 carbon atoms or phenyl esters, and said sulpho or carboxylic acid amides being unsubstituted amides, alkylamides, hydroxyalkylamides or cycloalkylamides having up to 18 carbon atoms, phenylamide or morpholide.

2. A triazole derivative according to claim 1, corresponding to the formula

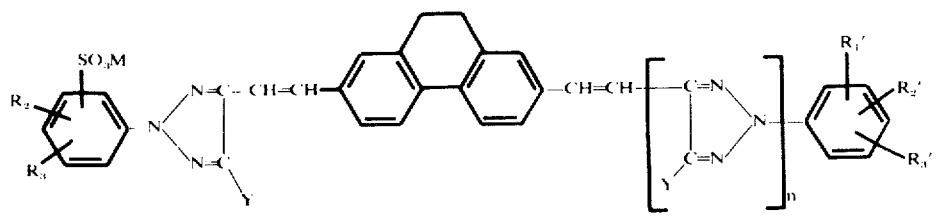

wherein the radicals $R_2$, $R_3$, $R'_1$, $R'_2$ and $R'_3$ are identical or different and denote hydrogen, alkyl with 1–12 C atoms, alkenyl with 3–4 C atoms, cyclohexyl, phenyl- (1-4C)-alkyl, alkoxy with 1–8 C atoms, phenyl- (1-4 C)-alkoxy, alkenyloxy with 3–4 C atoms, halogen, trifluoromethyl, the sulpho group including its water-soluble salts, esters and amides, the carboxyalkoxy wherein the alkoxy group contains up to 4 carbon atoms or carboxyl group, including its water-soluble salts and sulpho or carboxylic acid esters and sulpho or carboxylic acid amides, or a nitrile group, a phenylsulphonyl group or an alkylsulphonyl group having 1–18 C atoms, and two adjacent radicals R can form a methylenedioxy group, and Y and Y' are identical or different and represent hydrogen, methyl, halogen or a radical

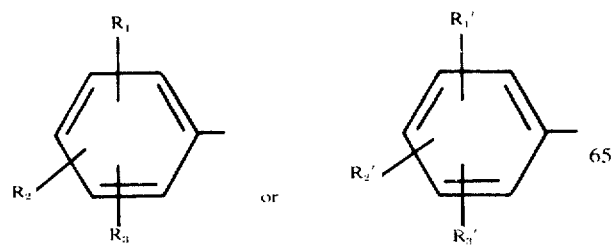

wherein $R_1$ has the same meaning as $R_2$, but these can, within a specific compound, be different from one another and M denotes a hydrogen ion or a cation which forms water-soluble salts and $n$ represents the number 0 or 1, said sulpho or carboxylic acid esters being alkyl esters, or alkenyl esters having up to 18 carbon atoms, or phenyl esters and said sulpho or carboxylic acid amides being unsubstituted amides alkylamides, hydroxyalkylamides or cycloalkylamides having up to 18 carbon atoms, phenylamide or morpholide.

3. A triazole compound according to claim 1, corresponding to the formula

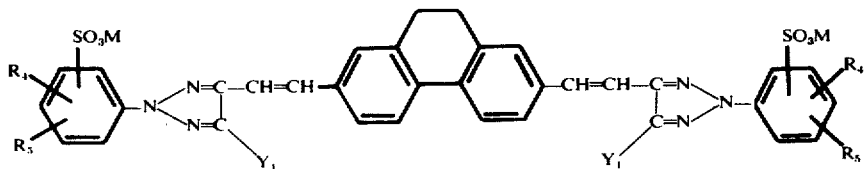

wherein $R_4$ represents hydrogen, an alkyl group with 1–4 C atoms, an alkoxy group with 1–4 C atoms or chlorine, $R_5$ denotes hydrogen, an alkyl group with 1–4 C atoms, an alkoxy group with 1–4 C atoms or chlorine, M represents a hydrogen ion or a cation which forms water-soluble salts and $Y_1$ represents hydrogen, chlorine or methyl.

4. A triazole compound according to claim 1, corresponding to the formula

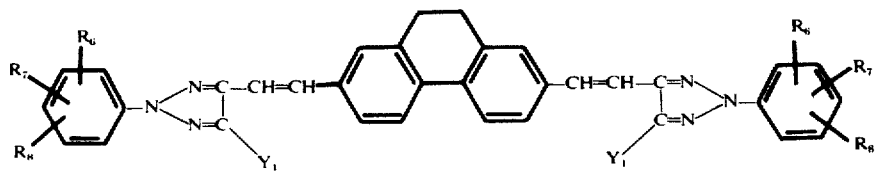

wherein $R_6$ denotes hydrogen, alkyl with 1–4 C atoms, chlorine, alkoxy with 1–4 C atoms, a sulpho or carboxylic acid ester, a sulpho or carboxylic acid amide, said sulpho or carboxylic acid ester being alkyl esters or alkenyl esters having up to 18 carbon atoms, or phenyl esters, and said sulpho or carboxylic acid amide being unsubstituted amides, alkylamides, hydroxyalkylamides or cycloalkylamides having up to 18 carbon atoms, phenylamide or morpholide; a phenylsulfphonyl group or an alkylsulphonyl group having 1–18 C atoms, a nitrile or an alkenyloxy group with 3–4 C atoms, $R_7$ represents hydrogen, alkoxy with 1–4 C atoms, alkyl with 1–4 C atoms or chlorine, $R_8$ represents hydrogen, alkyl with 1–4 C atoms or chlorine and $Y_1$ denotes hydrogen, chlorine or methyl.

5. A triazole compound according to claim 1, corresponding to the formula

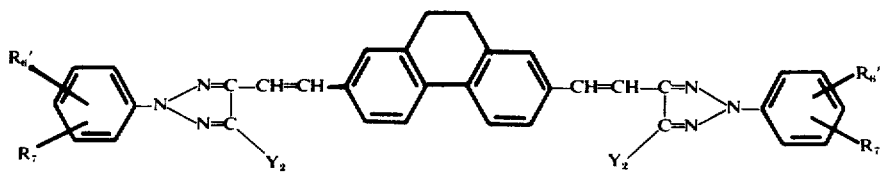

6. A triazole compound according to claim 1, corresponding to the formula

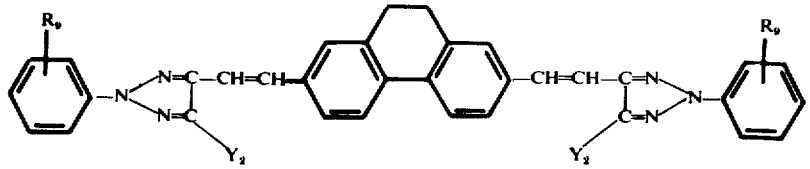

wherein $R_6'$ denotes hydrogen or the sulpho group or its Na or K salt, $R_7$ denotes hydrogen, alkoxy with 1 to 4 C atoms, alkyl with 1–4 C atoms or chlorine and $Y_2$ denotes hydrogen or methyl.

wherein $R_9$ represents hydrogen or the $-SO_3M$ group and M denotes a hydrogen ion or an alkali metal, alkaline earth metal or ammonium cation, and $Y_2$ represents hydrogen or methyl.

* * * * *

UNITED STATES PATENT AND TRADEMARK OFFICE
CERTIFICATE OF CORRECTION

PATENT NO. : 3,910,895
DATED : October 7, 1975
INVENTOR(S) : KURT WEBER ET AL

It is certified that error appears in the above-identified patent and that said Letters Patent are hereby corrected as shown below:

Column 23, line 1, delete the structural formula which now reads:

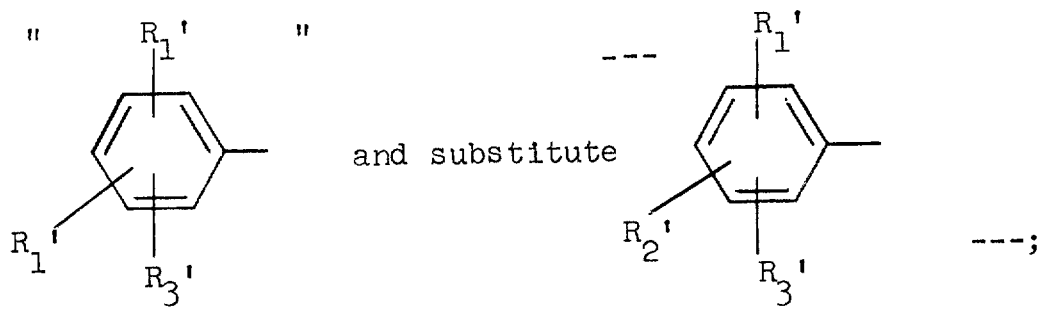

Column 23, line 26, delete the structural formula and substitute

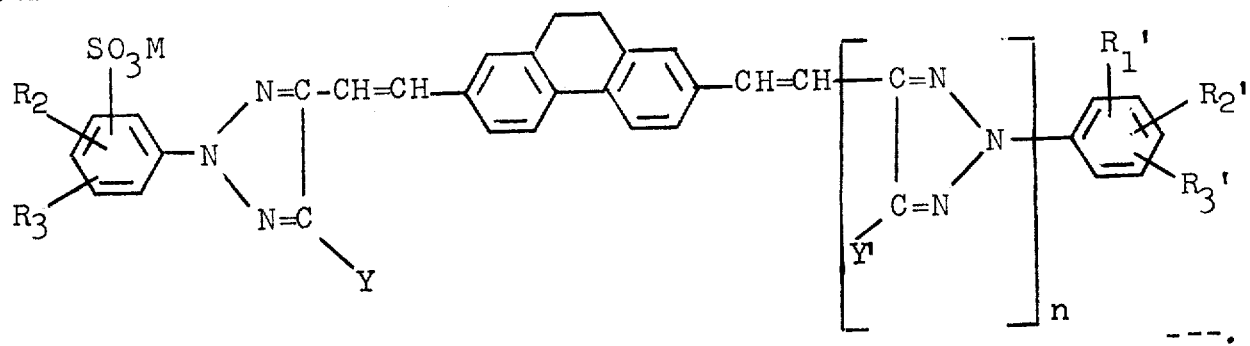

---.

Signed and Sealed this third Day of February 1976

[SEAL]

Attest:

RUTH C. MASON
*Attesting Officer*

C. MARSHALL DANN
*Commissioner of Patents and Trademarks*